Oct. 26, 1965
E. L. HOLT ETAL
3,214,357
ELECTROLYTIC REDOX PROCESS FOR CHEMICAL PRODUCTION
Filed Jan. 2, 1962
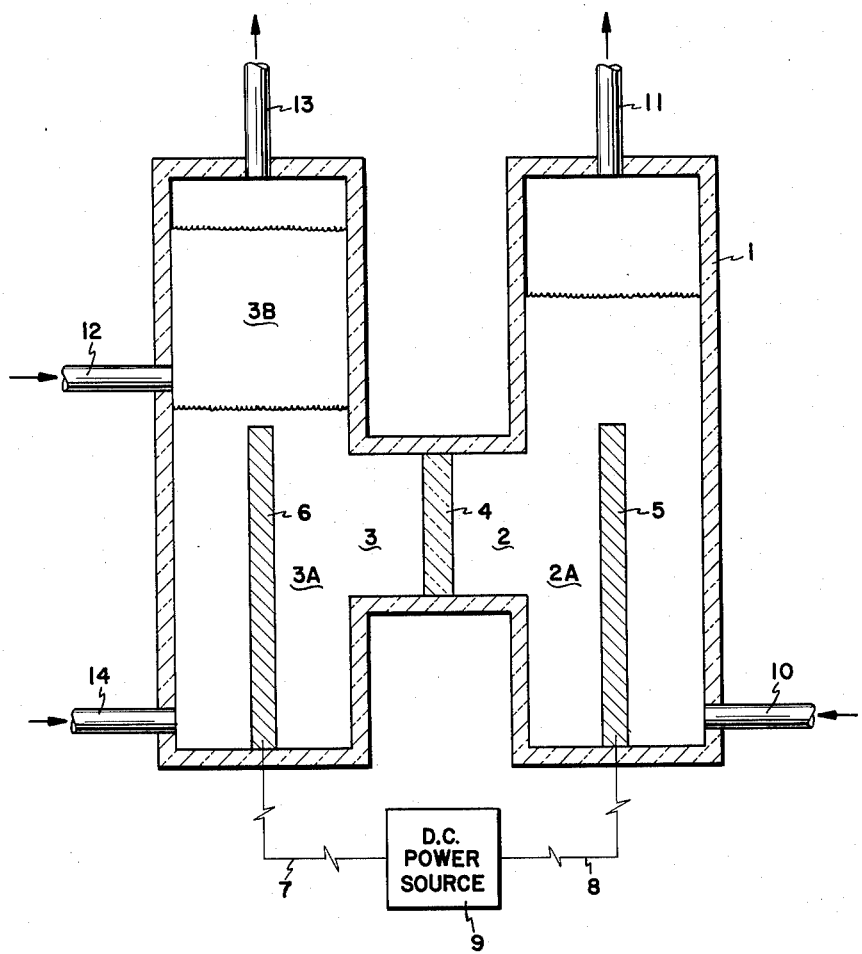
Eugene L. Holt
Barry L. Tarmy   INVENTORS
BY *Olin B. Johnson*
PATENT ATTORNEY United States Patent Office 3,214,357
Patented Oct. 26, 1965

3,214,357
ELECTROLYTIC REDOX PROCESS FOR
CHEMICAL PRODUCTION
Eugene L. Holt, Forest Hills, N.Y., and Barry L. Tarmy, Berkeley Heights, N.J., assignors to Esso Research and Engineering Company, a corporation of Delaware
Filed Jan. 2, 1962, Ser. No. 163,833
5 Claims. (Cl. 204—80)

This invention relates to a process for converting an olefinic organic feedstock to valuable chemical compounds which comprises electrochemical oxidation of a halide ion and reaction of the resulting halogen with an olefinically unsaturated organic compound. In particular, this invention relates to a partial oxidation process for producing an oxygen-containing organic compound which comprises electrochemical oxidation of a halide ion to the corresponding halogen, contacting the resulting halogen with an olefinically unsaturated organic compound, hydrolysis of the resulting dihalide, regeneration of said halide ion, and recovery of the oxygen-containing organic product.

In a preferred embodiment, this invention relates to a continuous process for producing ketones wherein halide ions are electrochemically oxidized in an electrolytic cell, the resulting halogen chemically reacted with a liquid olefin and the halide ion regenerated within the cell.

Thus, in accordance with this invention a halide ion passes through a continuous redox cycle in which such ion is alternately electrochemically oxidized and chemically regenerated. The process can be carried out employing iodide, chloride or bromide ions in either a basic or acidic electrolyte. The halide ion can be added to a separate aqueous electrolyte comprising a solution of $H_2SO_4$, $H_3PO_4$, $Na_2CO_3$, $K_2CO_3$, KOH, etc., or the electrolyte may be formed simply by forming an aqueous solution of a water soluble compound containing the desired ion, e.g., KBr, KCl, KI, HBr, HCl, HI, etc. In another alternative elemental halogen, i.e., $I_2$, $Br_2$, or $Cl_2$, is admitted to the olefinic feedstock and the corresponding halide ion generated by hydrolysis of the addition product formed by the halogen and the feedstock. The choice of halogen and electrolyte influence product type and distribution.

One embodiment of the instant process is utilized to produce a halogen substituted derivative of the oxygen-containing organic product.

The terms "anode" and "fuel electrode" are used interchangeably herein.

The terms "mixture" and "acid mixture" are used herein to refer to any intermingling of two or more acids including mixed solutions.

The invention will be more easily understood by referring to the accompanying drawing wherein one embodiment of the invention is illustrated by a schematic view of a cell which can be used to carry out this invention. Vessel 1, made of glass, ceramic, polypropylene, hard rubber, metal or other suitable electrolyte resistant material, is divided into a catholyte compartment 2 and an anolyte compartment 3 by an ion-permeable partition 4, e.g., a sintered glass frit. Inside catholyte compartment 2 is positioned a cathode 5 immersed in an aqueous catholyte 2A, e.g., an aqueous solution as aforedescribed. Inside anolyte compartment 3 is positioned an anode 6 immersed in an aqueous anolyte 3A and floating on top thereof a layer of liquid olefin 3B, e.g., an aliphatic $C_5$–$C_8$ olefin. Cathode 5 and anode 6 are electrically connected by wires 7 and 8 to a source of direct electric current or its equivalent 9, e.g., storage batteries, fuel cells, or an alternating current rectifier. Cathode 5 and anode 6 may take the form of grids or plates as shown here. In the alternative, a porous cathode may be used. The electrodes may consist of or be surfaced with noble metals of Group VIII of the Periodic Table or gold or alloys of the same. They may also consist of porous carbon either with or without catalyst impregnation. The anode preferably is formed or surfaced with bright or smooth platinum or gold. Conduit 10 provides inlet means for admitting electrolyte into the catholyte compartment. Conduit 11 provides exhaust means for escape of hydrogen gas evolved from the catholyte compartment 2. Conduit 12 provides means for admitting an olefinic primary fuel 3B into the upper part of anolyte compartment 3. Conduit 13 provides means for overhead removal from anolyte compartment 3, e.g., where a gaseous olefin is passed through the anolyte. Conduit 14 provides means for admitting an olefin feed, halogen or electrolyte to anolyte compartment 3. It is to be understood that the cell design and direction of flow through these conduits may be modified within the scope of the invention. For example, the partition in the electrolyte compartment can be removed and a common electrolyte employed.

In accordance with the process of this invention, direct electric current is supplied to cathode 5 at a potential such that the potential delivered at the anode is below that at which oxygen is evolved. Hydrogen is evolved at the cathode.

When the cell is partitioned as shown in the drawing by an ion-permeable partition, the partition may be any of the ion-permeable materials heretofore employed for the partition of fuel cells or cells of the type employed here. The partition should, of course, be chemically resistant to the electrolyte. These include glass frits and ion-permeable membranes. Membranes that can be used for this purpose include both ion-exchange resin membranes and ion-exchange interpolymer membranes. Certain non-ionic porous membranes are also suitable.

Ion-exchange resin membranes, i.e., organic membranes, at least one component of which is a polyelectrolyte, are well known in the art. Such membranes include in their polymeric structure dissociable ionizable radicals at least one ionic component of which is fixed to or retained by a polymeric matrix with at least one ion component being a mobile and replaceable ion electrostatically associated with the first component. The ability of the mobile ion to be replaced under appropriate conditions by other ions imparts ion-exchange characteristics to these materials.

An interpolymer ion-exchange membrane is one which is cast from a solution containing both a polymeric electrolyte or ionogenic material and a matrix polymer so as to form a film composed of these two intermeshed molecular species. A typical interpolymer membrane is made by dissolving linear polystyrene sulfonic acid and acrylonitrile in N,N-dimethylformamide, casting the solution as a film and evaporating off the solvent.

Any olefinic compound may be used which does not substantially impede the aforedescribed reaction cycle. The organic feed may therefore be a hydrocarbon feed consisting of olefins, diolefins or a mixture of the same or may consist of or include substituted hydrocarbons. Particularly preferred feedstocks among the unsaturated hydrocarbons having an olefinic linkage or bond are tertiary olefinic compounds including hydrocarbon olefins, and diolefins and oxygen-substituted hydrocarbons such as unsaturated alcohols, aldehydes, carboxylic acids, and ketones. Substituted hydrocarbon feeds which contain other substituents other than oxygen can, of course, be used where it is desired in order to create a particular product containing such substituent or group and such substituent does not interfere with the addition of halogen to the olefinic bond or the subsequent hydrolysis and regeneration of the ion. When a hydrocarbon feed is used, it is preferred to employ a $C_2$ to $C_{12}$, preferably a $C_4$ to $C_{10}$, and more preferably a $C_5$ to $C_8$ aliphatic monoolefin, e.g. ethylene, isobutylene, butene-2, a hexene, an octene, a decene, or a duodecene, with tertiary olefins preferred especially where the anolyte is acidic. However, it is within the scope of this invention to employ cyclic olefins, e.g. cyclohexene, and aromatic hydrocarbons having an olefinic unsaturation in a side chain substituent on the aromatic nucleus, e.g. styrene.

It is preferred to employ a olefinic reactant that will remain in liquid state at the conditions of temperature and pressure employed since the presence of a separate organic phase permits a build-up, of high halogen concentration in this layer resulting in more rapid regeneration and minimizing the amount of elemental halogen in the aqueous electrolyte. The presence of halogen in this organic layer also raises the boiling point of the resulting reactant-product mixture thus permitting the use of an olefinic feedstock in this embodiment which in the pure state would change from a liquid to a gas at the temperature employed.

In another embodiment the olefin is bubbled through the electrolyte as a gas.

The invention is illustrated by the following specific embodiment wherein an $I_2$–$I^-$ redox couple is employed with a liquid olefin, i.e. a $C_nH_{2n}$ hydrocarbon. A source of iodide ion, e.g. HI, KI, NaI, etc. is admitted to an electrolyte, e.g. 30 wt. percent $H_2SO_4$. The olefin, e.g. 2-methylbutene-2 is added to the electrolyte and forms a primarily organic layer above the aqueous electrolyte. Direct electric current is admitted to the cathode at a voltage sufficient to effect electrochemical oxidation of iodide ions at the anode but insufficient to effect oxygen evolution at such electrode. The iodide ions are discharged at the anode with a resulting production of iodine. The $I_2$ contacts and permeates the organic layer above the electrolyte and adds to the olefinic double bond forming the corresponding diiodide. In the presence of the electrolyte this compound hydrolyzes liberating hydriodic acid and yielding an oxygenated organic compound. With this feedstock, electrolyte and halogen, it is apparent that a glycol is first formed which upon standing in the presence of the electrolyte is converted to the corresponding ketone via the pinacolone rearrangement. Where the ketone formed has hydrogen atoms α to the carbonyl group, a substitution reaction occurs upon further contact with the iodine to form a corresponding iodoketone. The hydriodic acid is immediately ionized and the electrochemical cycle is repeated. The iodide ion can be introduced as elemental iodine since the regeneration reaction will quickly establish a working concentration of iodide ions.

It is preferred to carry out the regenerative steps of the process of this invention within the cell, i.e. within the half-cell with which such step is associated. However, it is within the scope of this invention to remove the halogen for external regeneration.

Temperature above about 70° F. and below the boiling point of the electrolyte employed can be used. It is preferred to employ a temperature in the range of about 130° to 200° F., preferably about 140° to 185° F., at atmospheric pressure.

Pressures above atmospheric can be used and are particularly useful with low molecular weight olefin feeds such as ethylene or propylene. Thus, pressures can be employed in the range of about 0 to 300 p.s.i.g. or greater with pressures in the range of about 0 to 30 p.s.i.g. preferred.

When sulfuric acid is employed as the anolyte or common electrolyte, it is preferred to employ $H_2SO_4$ in concentrations in the range of about 3 to 50 wt. percent, preferably about 20 to 40 wt. percent and most preferably about 25 to 35 wt. percent. When phosphoric acid is used it is preferred to employ phosphoric acid concentrations which correspond to the higher portion of the range employed with sulfuric acid or slightly higher.

Any concentration of halide ions up to the saturation point of the organic and aqueous phases may be used. It is preferred to employ an iodide yielding salt in amounts in the range of about 0.1 to 4 moles per liter of anolyte or greater. Routine testing will reveal the concentration most suitable with a particular electrolyte and organic feed.

This invention will be more fully understood from the following examples which are for purposes of illustration only, and should not be construed as limitations upon the scope of this invention as set forth in the appended claims.

*Example 1*

A glass cell constructed essentially as shown in the drawing is operated at atmospheric pressure at 122° F. in the following manner. Over a 30 wt. percent aqueous sulfuric acid anolyte containing 2 moles KI per liter is floated a liquid olefin, 2-methylbutene-2. The aqueous catholyte is also 30 wt. percent $H_2SO_4$ partitioned from the anolyte by an ion-permeable sintered glass frit. The anode and cathode are both platinum gauze. Direct current is admitted to the cathode. The cell is operated through repeated cycles of oxidation and regeneration of the iodide present in the anolyte. Current densities of about 25 amps./ft.$^2$ (superficial anode surface) are maintained during the run at anode potentials of from 0.4 to 0.5 volt below Standard Hydrogen Reference. A potential of about 0.8 volt below Standard Hydrogen Reference is maintained at the cathode. The resulting organic layer is analyzed and found to contain unreacted olefin, methyl isopropyl ketone, and a mixture of iodine substituted ketones.

*Example 2*

In another run the following changes are made. The KI concentration in the anolyte is 1 mole per liter, the glass frit partition is replaced with a cation-exchange membrane, gaseous isobutylene is bubbled through the anolyte. An electrolyte temperature of 149° F. is employed and a ketone product recovered.

*Example 3*

In another run the halogen is changed to bromine. In this run an anolyte is employed consisting of 100 ml. of 1/10 molar $K_2CO_3$ and 2 molar KBr above which is floated 50 ml. of 2-methylbutene-2. A catholyte consisting of 150 ml. of 1/10 molar $K_2CO_3$ is employed on the opposite side of the ion-permeable partition. The anode is bright platinum and the cathode is platinum black on platinum gauze. The electrolyte is maintained at a temperature of about 95° F. Direct current is supplied to the cathode and the voltage increased until oxygen evolution is initiated at the anode at an anode potential of 1.08 volts below (negative to) Standard Hydrogen Reference. The voltage is then reduced until oxygen is no longer evolved and the cell is operated with a current density at the cathode of about 23 amps./ft.$^2$ at an anode potential of 1.02 volts below Standard Hydrogen Reference. At the cathode hydrogen gas is evolved at a potential of 0.77 volt above Standard Hydrogen Reference. A cell is operated for two cycles of regeneration and the organic layer is recovered and analyzed. The organic product is a mixture of branched chain aliphatic ethers.

*Example 4*

The procedure of Example 3 is repeated except that the electrolyte employed is 30 wt. percent aqueous sulfuric acid. The organic product recovered is a glycol and tertiary and secondary iso amyl alcohols.

What is claimed is:

1. A process for opening an electrolytic cell comprising in combination an electrolyte compartment, an anode communicating with said electrolyte compartment, a cathode spaced apart from said anode and communicating with said electrolyte compartment, an aqueous acidic electrolyte in said electrolyte compartment, an iodo ion in said electrolyte, conduction means establishing electrical connection between said anode and cathode, means for admitting a direct electric current to said cathode, and means for admitting a fluid, olefinic, organic compound into contact with said electrolyte, which process comprises introducing said organic compound into contact with said electrolyte, admitting a direct electric current to said cathode at a potential insufficient to evolve oxygen gas at said anode and recovering said compound and a ketone product from said electrolyte.

2. A process in accordance with claim 1 wherein said organic compound is a $C_2$–$C_{12}$ olefin.

3. A process for operating an electrolytic cell comprising in combination an electrolyte compartment, an ion-permeable partition dividing said electrolyte compartment into an anolyte zone and a catholyte zone, an anode in said anolyte zone, a cathode in said catholyte zone, an aqueous sulfuric acid anolyte in said anolyte zone, an aqueous sulfuric acid catholyte in said catholyte zone, an iodo ion in said anolyte zone, conduction means establishing electrical connection between said anode and said cathode external to said anolyte and catholyte, and means for admitting a fluid, olefinic, organic compound into contact with said anolyte, which process comprises introducing said organic compound into contact with said anolyte, admitting a direct electric current to said cathode at a potential insufficient to evolve oxygen gas at said anode and recovering said compound and a ketone product from said electrolyte.

4. A process in accordance with claim 3 wherein the concentration of iodo ion in said anolyte zone is at least 0.1 normal.

5. A process in accordance with claim 3 wherein the temperature of said anolyte is in the range of about 70° to 200° F.

References Cited by the Examiner

UNITED STATES PATENTS

| | | | |
|---|---|---|---|
| 1,264,535 | 4/18 | McElroy | 204—80 |
| 1,308,797 | 7/19 | McElroy | 204—80 |
| 1,875,310 | 8/32 | Youtz | 204—80 |

JOHN H. MACK, *Primary Examiner.*

MURRAY TILLMAN, WINSTON A. DOUGLAS,
*Examiners.*